Patented Aug. 26, 1952

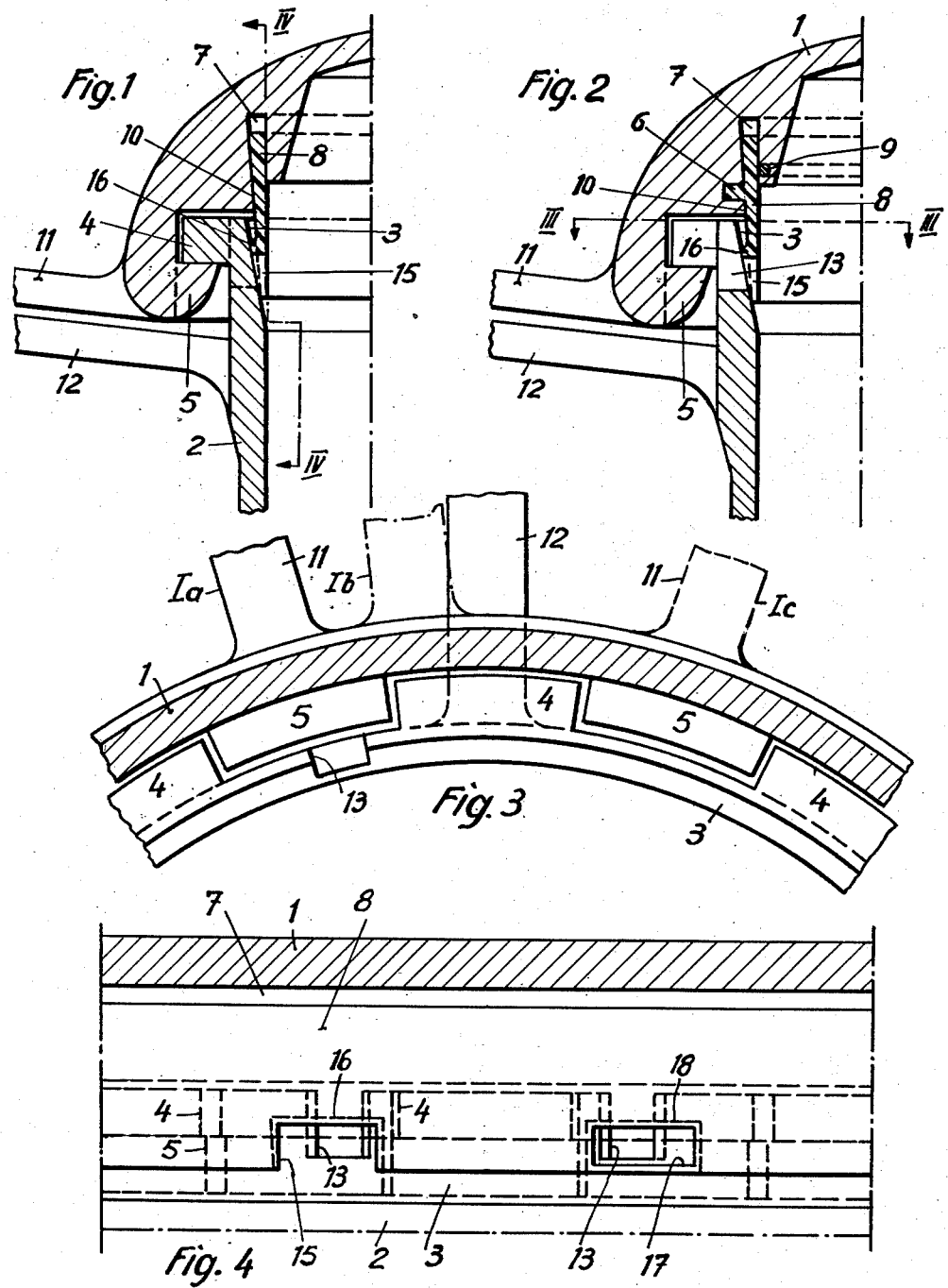

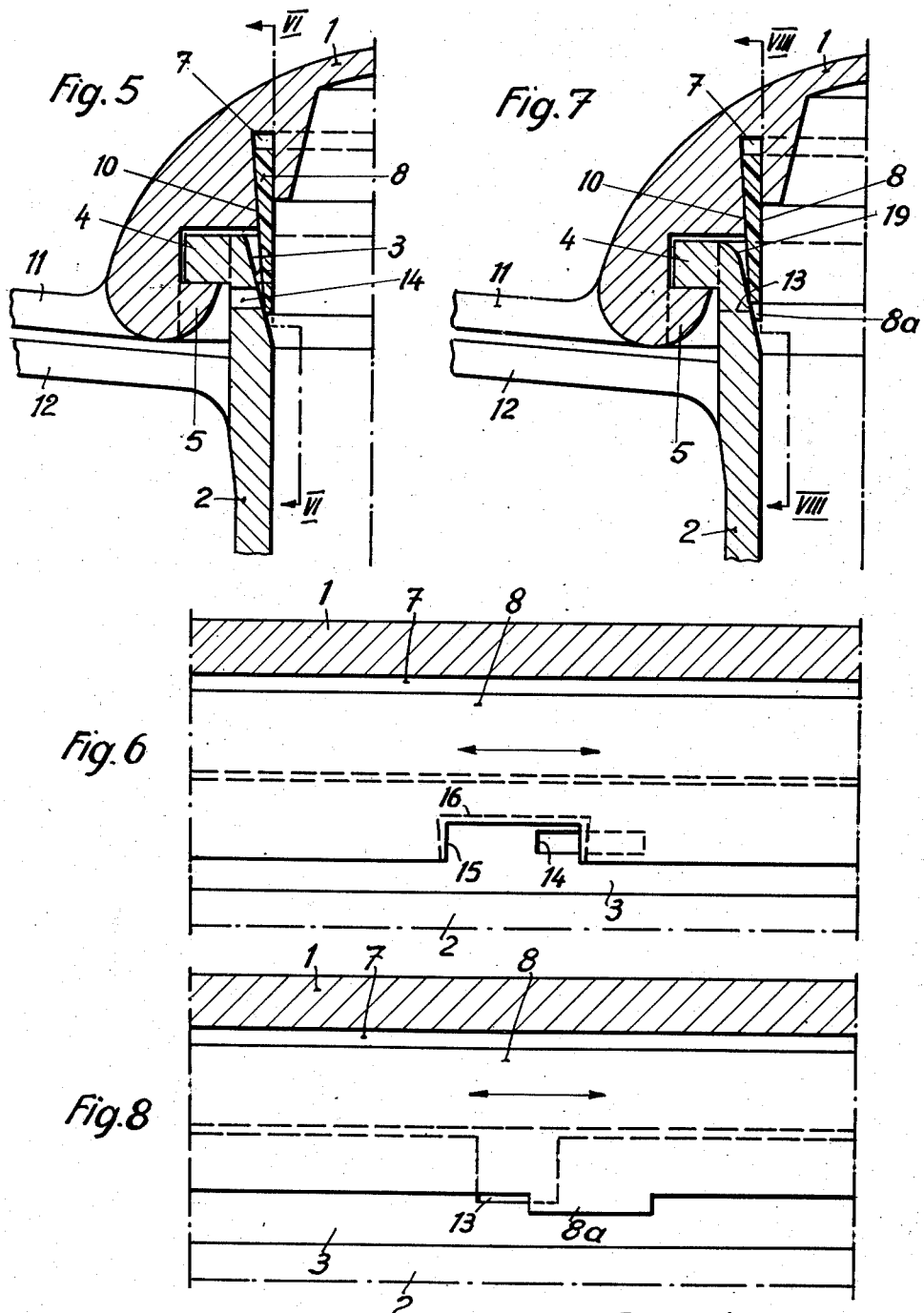

2,608,318

UNITED STATES PATENT OFFICE 2,608,318

PRESSURE COOKER

Max Keller, Zurich, Switzerland

Application October 22, 1949, Serial No. 122,904
In Switzerland November 26, 1948

8 Claims. (Cl. 220—40)

The invention relates to a pressure cooker with a pot, which is closable by a lid that is adapted to be locked by means of a bayonet catch, and with a sealing means in the form of a packing ring.

The invention consists in the fact that the pot has one or more edge depressions or wall perforations and the packing ring is so formed that, on putting the lid on the pot, the interior of the latter communicates with the atmosphere and this communication is maintained during the rotation of the lid into the locking position until immediately before it reaches the latter position and that, on rotating the lid from the locking position into the position of release, the communication is established before it reaches the latter position.

Three embodiments of the pressure cooker according to the invention are represented by way of example by the accompanying drawings, of which Fig. 1 is a vertical section through a part of a pressure cooker according to the first embodiment, showing the lid in the locked position;

Fig. 2 is the same vertical section, but showing the lid unlocked;

Fig. 3 is a section on the line III—III of Fig. 2;

Fig. 4 is a section on the line IV—IV of Fig. 1;

Fig. 5 is a vertical section through a part of a pressure cooker according to the second embodiment;

Fig. 6 is a section on the line VI—VI of Fig. 5;

Fig. 7 is a vertical section through a part of a pressure cooker according to the third embodiment; and Fig. 8 is a section on the line VIII—VIII of Fig. 7.

1 denotes the lid which is used for closing the pot 2 and on which a safety valve (not shown) is arranged. The pot 2 has, on its open end, a conical surface 3 which widens towards the edge of the pot and serves as a sealing surface and it also has, on its open end, a flange with recesses which serve for the formation of a number of segments 4. The lid 1 is placed over the edge of the pot and bears, at its overlap, a number of locking teeth 5 which, on the rotation of the lid that is put on the pot, are moved to below the segments 4. The lid 1 has, on its inside, a groove 7 which serves for receiving a packing ring 8.

The packing ring 8, according to the embodiment shown in Fig. 1, is made slightly conical at the part that is to be forced into the groove 7, in order that it should not drop out of the groove 7. However, it may have a uniform thickness throughout all the part that lies within the groove. In order that, in such a case, the packing ring should not drop out of the groove, it may have a ledge-shaped or rib-shaped projection that is to be inserted in a second groove or rabbet (Fig. 2) or it may be clamped by means of an open spring ring 9 inserted in the groove 7 of the lid.

The part of the packing ring 8 that projects beyond the groove 7 lies on a conical surface 10 of the lid, which surface serves as a sealing surface. The angle of inclination, which the conical surface 10 of the lid makes with the vertical, is smaller than the angle which the conical surface 3 of the pot makes with the vertical. In addition, the diameter of the packing ring 8 at its free edge is smaller than the diameter of the conical surface 3 at the open end of the pot. Consequently, when the lid is put on the pot, the packing ring 8 is pushed, without resistance and without deformation, into the latter, its edge lying on the conical surface 3. In this position, the packing ring 8, under the weight of the lid, already effects complete sealing. In order to lock the lid on the pot, the former is rotated from its pressure 1a or 1b until the handle 11 of the lid is located above the handle 12 of the pot and the locking teeth 5 lie completely beneath the segments 4.

The edge of the pot 2 is provided with an edge depression 13 (Figs. 2, 3 and 4), instead of which a perforation 14 (Figs. 5 and 6) of any desired shape could be provided. The packing ring 8 has an edge recess 15 or, instead, a slot 17. In order that the packing ring 8 should also effect sealing at the part provided with the edge recess 15 or the slot 17, an edge reinforcement in the form of a bead or the like is necessary on account of the different angles of inclination of the two sealing surfaces 3 and 10. The edge depression 13, or, instead, the perforation 14, and the edge recess 15, or, instead, the slot 17, occupy such positions that, when the lid is put on the pot with its handle 11 in the position 1a shown in Fig. 3, the inside of the pot communicates with the atmosphere. This communication is maintained on rotating the handle 11 of the lid in the direction towards the handle 12 of the pot until it has reached approximately the position 1b, and is then interrupted on rotating the lid further into the position in which the handle of the lid lies above the handle of the pot. In this last mentioned position, which corresponds to the locking position of the lid, the locking teeth 5 lie completely beneath the segments 4. On rotating the lid back from the locking position into the released position, the communication of the inside of the pot with the atmosphere is restored when the position Ib is reached, whilst the lid can be removed from the pot only when the handle 11 has arrived at the position Ia.

By means of this method, the result is obtained that, on putting the lid on a pot which is under the action of a heating agent, an increase of pressure can be obtained only after rotation of the lid into the locking position has been carried out and, conversely, that, on rotating the lid into the releasing position, an equalisation of pressure is possible before the latter position is reached, i. e., before the release of the locking teeth 5 by the segments 4 takes place, so that a slipping off of the lid is impossible. At the same time, in order to prevent accidents, the sudden escape of large quantities of frothing material being cooked is rendered impossible.

The same result can be obtained with edge recesses 15 on the packing ring 8 or with slots 17 if the packing ring 8 is shorter and its free edge lies on a circle of the conical surface 3 of the pot, which packing ring is located above the bottom edge of the edge depression 13 on the edge of the pot, as shown in Figs. 7 and 8. For sealing the edge depression 13, the packing ring 8 is, in this case, provided with a lug 8a which is placed in front of the edge depression 13 when the lid is rotated into the locking position and the handle 11 of the lid comes to lie above the handle 12 of the pot. If there are a plurality of edge recesses on the pot, a corresponding number of lugs 8a projecting beyond the free end are to be provided on the packing ring 8. Such a packing ring 8 provided with lugs 8a can also be used as a sealing means when the pot is provided with perforations 14 in the wall instead of with the edge depressions 13.

It has been found to be advantageous to provide two edge recesses 15 or slots 17 on the packing ring 8, in order that one or the other of the two should be effective according to whether the lid is rotated from the locking position to the position Ia or Ic of the handle of the lid or vice versa. However, two or more edge depressions 13 or perforations 14 in the pot and a corresponding number of edge recesses 15 or slots 17 may be provided on the packing ring 8. The edge depressions 13 or perforations 14, on the one hand, and the edge recesses 15 or slots 17, on the other, which could also be provided on pots without a conical sealing surface 3, constitute a safety means which is additional to the safety valve already provided on the lid, since, one rotating the lid into the unlocking position, they bring about an equalisation of pressure if, owing to an oversight, it has not already been brought about by opening the safety valve. If, for any reason, the safety valve should fail when a particular pressure is reached within the pot, a rise in pressure above the permissible maximum pressure effects a deformation of the part of the packing ring 8 that covers the edge depression 13 or the wall perforation 14. The result of this deformation is a partial freeing of the edge depression 13 or of the wall perforation 14 and, consequently, a reduction of pressure in the pot. This effect is also produced if there are more than one edge depression 13 or wall perforation 14. The arrangement of edge depressions and or wall perforations on the pot and of edge recesses or slots on the packing ring consequently constitutes a valuable complement to the existing safety valve.

As shown in Figs. 1, 2 and 5, the position at which the packing ring 8 emerges from the groove 7 is above the open end of the pot. The result of this is that, when the internal pressure increases, the packing ring 8 is pressed both to the conical sealing surface 3 of the pot 2 and to the conical (Figs. 1 and 2) or cylindrical (Fig. 5) sealing surface 10 of the lid, so that a faultless and secure sealing is ensured at internal pressures of any desired magnitude.

In the examples of embodiment described, the pot 2 has a conical sealing surface 3 which widens towards the edge of the pot and instead of which a curved surface 19 could be provided, as shown in Fig. 7. Since, in such a case, the pot has, at its opening, a greater diameter than that of the packing ring at its free edge, the lid can also, without resistance and without deformation of the packing ring be put on the pot and rotated into the locking position.

What I claim is:

1. A pressure cooker, comprising in combination, a pot having a rim and at least one recess in the region of said rim; a detachable lid fitting onto the rim of said pot; first locking means integral with the rim of said pot; second locking means integral with the edge of said lid, and adapted to engage said first locking means so as to tightly secure said lid to said pot in a predetermined position, and to release said lid when said lid is turned for a predetermined angle in either direction; and an annular sealing member secured to the inner surface of said lid and projecting downwardly inside of and adjacent to said rim of said pot so as to be in lateral sealing contact with the inner surface of said pot adjacent to said rim when said lid is secured to said pot by said locking means, said sealing member having at least one recess being shaped so as to leave at least one recess in the region of the rim of said pot uncovered while said locking means are not fully engaged, and having sealing portions closing at least one recess when said locking means are fully engaged.

2. A pressure cooker, comprising in combination, a pot having a rim and at least one perforation in the region of said rim; a detachable lid fitting onto the rim of said pot; first locking means integral with the rim of said pot; second locking means integral with the edge of said lid, and adapted to engage said first locking means so as to tightly secure said lid to said pot in a predetermined position, and to release said lid when said lid is turned for a predetermined angle in either direction; and an annular sealing member secured to the inner surface of said lid and projecting downwardly inside of and adjacent to said rim of said pot so as to be in lateral sealing contact with the inner surface of said pot adjacent to said rim when said lid is secured to said pot by said locking means, said sealing member having at least one recess being shaped so as to leave at least one perforation in the region of the rim of said pot uncovered while said locking means are not fully engaged, and having sealing portions closing at least one perforation when said locking means are fully engaged.

3. A pressure cooker comprising in combination, a pot having a rim and at least one recess in the region of said rim; a detachable lid fitting onto the rim of said pot; first locking means integral with the rim of said pot; second locking means integral with the edge of said lid, and adapted to engage said first locking means so as to tightly secure said lid to said pot in a predetermined position, and to release said lid when said lid is turned for a predetermined angle in either direction; and an annular sealing member secured to the inner surface of said lid and projecting downwardly inside of and adjacent to said rim of said pot so as to be in lateral sealing contact with the inner surface of said pot adjacent to said rim when said lid is secured to said pot by said locking means, said sealing member having at least one slot being shaped so as to leave at least one recess in the region of the rim of said pot uncovered while said locking means are not fully engaged, and having sealing portions closing at least one recess when said locking means are fully engaged.

4. A pressure cooker comprising in combination, a pot having a rim and at least one perforation in the region of said rim; a detachable lid fitting onto the rim of said pot; first locking means integral with the rim of said pot; second locking means integral with the edge of said lid, and adapted to engage said first locking means so as to tightly secure said lid to said pot in a predetermined position, and to release said lid when said lid is turned for a predetermined angle in either direction; and an annular sealing member secured to the inner surface of said lid and projecting downwardly inside of and adjacent to said rim of said pot so as to be in lateral sealing contact with the inner surface of said pot adjacent to said rim when said lid is secured to said pot by said locking means, said sealing member having at least one slot being shaped so as to leave at least one perforation in the region of the rim of said pot uncovered while said locking means are not fully engaged, and having sealing portions closing at least one perforation when said locking means are fully engaged.

5. A pressure cooker comprising in combination, a pot having a rim and at least one recess in the region of said rim, the inner surface of said pot adjacent to said rim having a portion widening upwardly and outwardly, and extending from immediately below said recesses to the rim of said pot; a detachable lid fitting onto the rim of said pot; first locking means integral with the rim of said pot; second locking means integral with the edge of said lid, and adapted to engage said first locking means so as to tightly secure said lid to said pot in a predetermined position, and to release said lid when said lid is turned for a predetermined angle in either direction; and an annular sealing member secured to the inner surface of said lid and projecting downwardly inside of and adjacent to said rim of said pot so as to be in lateral sealing contact with the inner surface of said pot adjacent to said rim when said lid is secured to said pot by said locking means, said sealing member having at least one recess, being shaped so as to leave said recesses in the region of the rim of said pot uncovered while said locking means are not fully engaged, and having sealing portions closing said recesses when said locking means are fully engaged, and adapted to uncover portions of said recesses by elastically expanding when a predetermined maximum pressure is exceeded.

6. A pressure cooker comprising in combination, a pot having a rim and at least one perforation in the region of said rim, the inner surface of said pot adjacent to said rim having a portion widening upwardly and outwardly, and extending from immediately below said perforations to the rim of said pot; a detachable lid fitting onto the rim of said pot; first locking means integral with the rim of said pot; second locking means integral with the edge of said lid, and adapted to engage said first locking means so as to tightly secure said lid to said pot in a predetermined position, and to release said lid when said lid is turned for a predetermined angle in either direction; and an annular sealing member secured to the inner surface of said lid and projecting downwardly inside of and adjacent to said rim of said pot so as to be in lateral sealing contact with the inner surface of said pot adjacent to said rim when said lid is secured to said pot by said locking means, said sealing member having at least one recess being shaped so as to leave said perforations in the region of the rim of said pot uncovered while said locking means are not fully engaged, and having sealing portions closing said perforations when said locking means are fully engaged, and adapted to uncover portions of said perforations by elastically expanding when a predetermined maximum pressure is exceeded.

7. A pressure cooker comprising in combination, a pot having a rim and at least one recess in the region of said rim, the inner surface of said pot adjacent to said rim having a portion widening upwardly and outwardly, and extending from immediately below said recesses to the rim of said pot; a detachable lid fitting onto the rim of said pot; first locking means integral with the rim of said pot; second locking means integral with the edge of said lid, and adapted to engage said first locking means so as to tightly secure said lid to said pot in a predetermined position, and to release said lid when said lid is turned for a predetermined angle in either direction; and an annular sealing member secured to the inner surface of said lid and projecting downwardly inside of and adjacent to said rim of said pot so as to be in lateral sealing contact with the inner surface of said pot adjacent to said rim when said lid is secured to said pot by said locking means, said sealing member having at least one slot being shaped so as to leave said recesses in the region of the rim of said pot uncovered while said locking means are not fully engaged, and having sealing portions closing said recesses when said locking means are fully engaged, and adapted to uncover portions of said recesses by elastically expanding when a predetermined maximum pressure is exceeded.

8. A pressure cooker comprising in combination, a pot having a rim and at least one perforation in the region of said rim, the inner surface of said pot adjacent to said rim having a portion widening upwardly and outwardly, and extending from immediately below said perforations to the rim of said pot; a detachable lid fitting onto the rim of said pot; first locking means integral with the rim of said pot; second locking means integral with the edge of said lid, and adapted to engage said first locking means so as to tightly secure said lid to said pot in a predetermined position, and to release said lid when said lid is turned for a predetermined angle in either direction; and an annular sealing member secured to the inner surface of said lid and projecting downwardly inside of and adjacent to said rim of said pot so as to be in lateral sealing contact with the inner surface of said pot adjacent to said rim when said lid is secured to said pot by said locking means, said sealing member having at least one slot being shaped so as to leave said perforations in the region of the rim of said pot uncovered while said locking means are not fully engaged, and having sealing portions closing said perforations when said locking means are fully engaged, and adapted to uncover portions of said perforations by elastically expanding when a predetermined maximum pressure is exceeded.

MAX KELLER.

REFERENCES CITED

The following references are of record in the file of this patent:

UNITED STATES PATENTS

| Number | Name | Date |
|---|---|---|
| 1,499,364 | Goodrick | July 1, 1924 |
| 2,185,987 | Krauseset et al. | Jan. 2, 1940 |
| 2,218,188 | Wittenberg | Oct. 15, 1940 |
| 2,399,115 | Hansen et al. | Oct. 15, 1940 |
| 2,552,642 | Morrison | May 15, 1951 |

FOREIGN PATENTS

| Number | Country | Date |
|---|---|---|
| 485,051 | Great Britain | May 13, 1938 |